(12) United States Patent
Meng et al.

(10) Patent No.: US 8,520,101 B2
(45) Date of Patent: Aug. 27, 2013

(54) IMAGE SENSOR AND BLACK LEVEL CALIBRATION METHOD THEREOF

(75) Inventors: Chao-Yu Meng, Hsinchu (TW); Wei Hsu, Longtan Township, Taoyuan County (TW); Wen-Shen Wuen, Xinfeng Township, Hsinchu County (TW)

(73) Assignee: Novatek Microelectronics Corporation, Hsinchu (TW)

( * ) Notice: Subject to any disclaimer, the term of this patent is extended or adjusted under 35 U.S.C. 154(b) by 0 days.

(21) Appl. No.: 13/442,103

(22) Filed: Apr. 9, 2012

(65) Prior Publication Data

US 2013/0016259 A1   Jan. 17, 2013

(30) Foreign Application Priority Data

Jul. 11, 2011   (TW) .............................. 100124489 A

(51) Int. Cl.
*H04N 9/64* (2006.01)
*H04N 5/335* (2011.01)

(52) U.S. Cl.
USPC ............................. 348/243; 348/241; 348/294

(58) Field of Classification Search
USPC .................................................. 348/241, 243
See application file for complete search history.

(56) References Cited

U.S. PATENT DOCUMENTS

| 6,774,942 B1 | 8/2004 | Salcedo et al. |
| 7,760,258 B2 | 7/2010 | Huang et al. |
| 7,817,197 B2 | 10/2010 | Noguchi |

*Primary Examiner* — Roberto Velez
*Assistant Examiner* — Stephen Coleman
(74) *Attorney, Agent, or Firm* — Rabin & Berdo, P.C.

(57) ABSTRACT

An image sensor including a pixel array, a sampling circuit and a black level calibration circuit is provided. The pixel array includes a first optical black area, a second optical black area and an active pixel area. The sampling circuit respectively reads first optical black information, second optical black information and active pixel information from the first optical black area, the second optical black area and the active pixel area. The black level calibration circuit determines a black level offset according to the first optical black information, and determines a black level calibration value for calibrating the active pixel information.

22 Claims, 9 Drawing Sheets

IMAGE SENSOR AND BLACK LEVEL CALIBRATION METHOD THEREOF

This application claims the benefit of Taiwan application Serial No. 100124489, filed Jul. 11, 2011, the subject matter of which is incorporated herein by reference.

BACKGROUND OF THE INVENTION

1. Field of the Invention

The invention relates in general to an image sensor, and more particularly to an image sensor and a black level calibration method.

2. Description of the Related Art

An image sensor, e.g., a charge-coupling device (CCD) or a complementary metal-oxide-semiconductor (CMOS), is a digital optical sensing element for replacing the conventional film. Active pixels of an image sensor detect different degrees of brightness and wavelengths of light emitted from different objects, and read analog information such as a pixel voltage from data detected. The image sensor then converts the analog information to digital information that can be digitally processed.

An image sensor itself is an energy-consuming (power-consuming) equipment. Accompanied with energy consumption, heat energy is produced to aggravate activities of electrons in a chip material. The heated electronics with continuous movements then generate an electric current to form a so-called black current.

An image sensor ideally has a zero black current. However, in the real world, a black current is nevertheless produced due to various factors, a most significant of which is the heat. When a voltage of the black current is substantially the same as a voltage of a low-intensity light, it is in equivalence that pixels of an image sensor "perceive" an object such that exposure is triggered to present a result on a screen.

SUMMARY OF THE INVENTION

The disclosure is directed to an image sensor and a black level calibration method thereof. By real-time calibrating active analog information of an active pixel area according to first optical black information of a first optical black area and second optical black information of a second optical black area, a black level caused by a black current can be improved.

According to an aspect of the present invention, a black level calibration method for an image sensor is provided. The image sensor comprises at least a pixel array comprising a first optical black area, a second optical black area and an active pixel area. The method comprises: reading first optical black analog information from a first optical black area, determining a black level offset according to the first optical black analog information, reading second optical black analog information from a second optical black area, determining a black level calibration value according to the black level offset and the second optical black analog information, reading active analog information from an active pixel area, and calibrating a black level of the active analog information according to the black level calibration value.

According to another aspect of the present invention, an image sensor is provided. The image sensor comprises a pixel array, a sampling circuit and a black level calibration circuit. The pixel array comprises a first optical black area, a second optical black area and an active pixel area. The sampling circuit reads first optical black analog information from the first optical black area, second optical black analog information from the second optical black area, and active analog information from the active pixel area. The black level calibration circuit determines a black level offset according to the first optical black analog information, and determines a black level calibration value for calibrating the active analog information according to the black level offset and the second optical black analog information.

The above and other aspects of the invention will become better understood with regard to the following detailed description of the preferred but non-limiting embodiments. The following description is made with reference to the accompanying drawings.

DETAILED DESCRIPTION OF THE INVENTION

To overcome the problem of black level caused by a black current, an image sensor and a black level calibration method thereof are disclosed according to an embodiment of the present invention. The image sensor comprises a pixel array, a sampling circuit and a black level calibration circuit. The pixel array comprises a first optical black area, a second optical black area and an active pixel area. The sampling circuit reads first optical black analog information from the first optical black area, second optical black analog information from the second optical black area, and active analog information from the active pixel area. The black level calibration circuit determines a black level offset according to the first optical black analog information, and determines a black level calibration value for calibrating the active analog information according to the black level offset and the second optical black analog information.

The black level calibration method comprises: reading first optical black analog information from a first optical black area, determining a black level offset according to the first optical black analog information, reading second optical black analog information from a second optical black area, determining a black level calibration value according to the black level offset and the second optical black analog information, reading active analog information from an active pixel area, and calibrating a black level of the active analog information according to the black level calibration value.

Figure 1:
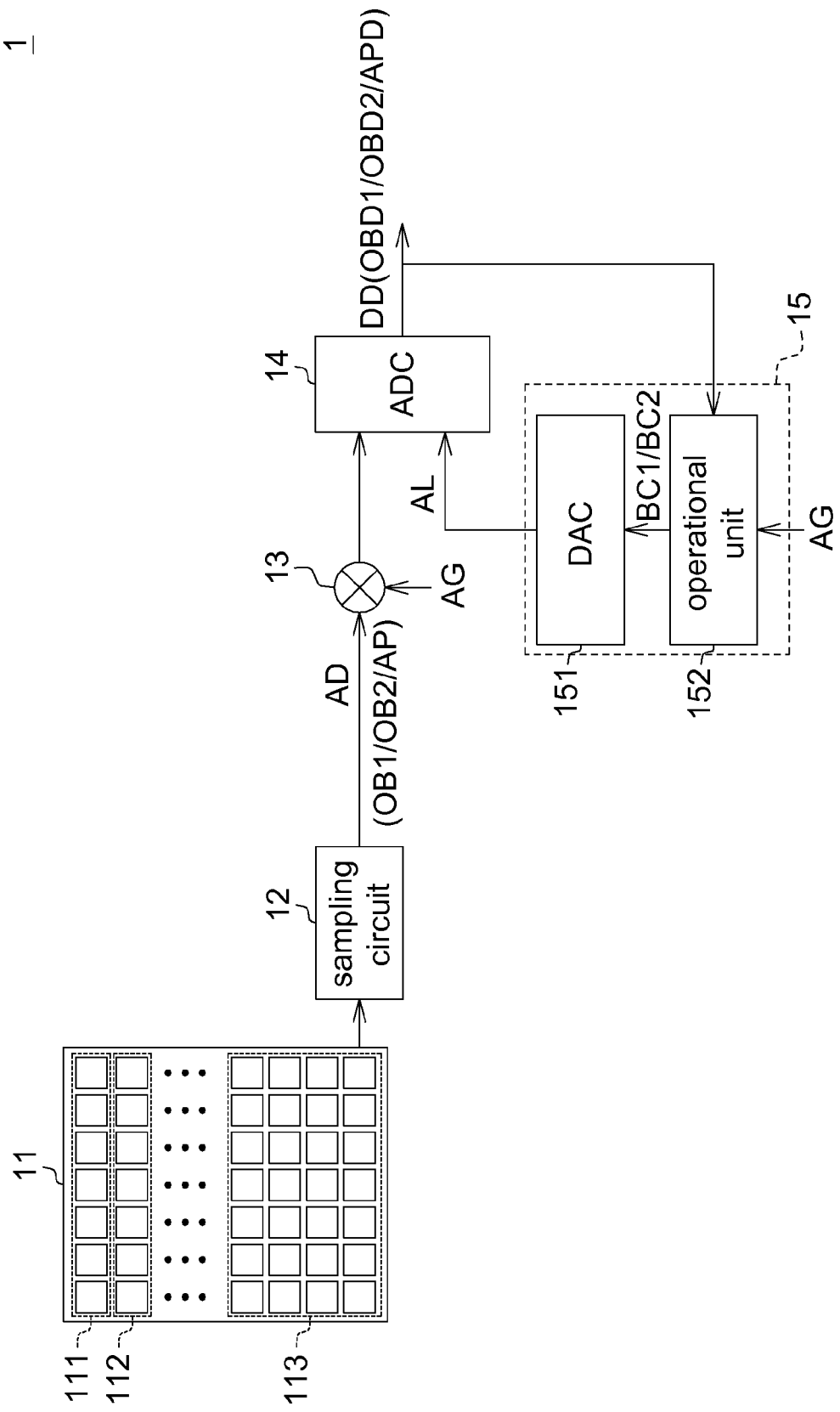
FIG. 1 is a schematic diagram of an image sensor according to an embodiment of the present invention.

FIG. 1 shows a schematic diagram of an image sensor according to an embodiment of the present invention. An image sensor 1 comprises a pixel array 11, a sampling circuit 12, an analog amplifier 13, an analog-to-digital converter (ADC) 14 and a black level calibration circuit 15. The pixel array 11 comprises a first optical black area 111, a second optical black area 112 and an active pixel area 113. The first optical black area 111 and the second optical black area 112 respectively comprise a plurality of black pixels, and the active pixel area 113 comprises a plurality of active pixels. The sampling 12 reads first optical black analog information OB1, second optical black analog information OB2 and active analog information AP from the first optical black area 111, the second optical black area 112 and the active pixel area 113, respectively.

The analog amplifier 13 amplifies analog information AD according to an analog gain AG and outputs the amplified analog information AD to the ADC 14. For example, the analog information AD is the first optical black analog information OB1, the second optical black analog information OB2 or the active analog information AP.

The ADC 14 converts the amplified analog information AD to digital information DD according to an analog level AD. For example, the digital information DD is first optical black digital information OBD1, second optical black digital information OBD2 or active digital information APD respectively corresponding to the first optical black analog information OB1, the second optical black analog information OB2 or the active analog information AP. The ADC 14 may shift the first optical black analog information OB1, the second optical black analog information OB2 or the active analog information AP upwards or downwards along with changes in the analog level AL during the above conversion.

The black level calibration circuit 15 determines a black level offset BC1 according to the first optical black analog information OB1, and outputs the analog level AL according to the black level offset BC1 to the ADC to calibrate the black level of the second optical black analog information OB2. The black level calibration circuit 15 further determines a black level calibration value BC2 according to the black level offset BC1 and the second optical black analog information OB2, and outputs the AL according to the black level calibration value BC2 to the ADC 14 to calibrate the black level of the active analog information AP.

Preferably, when determining the black level offset BC1 and the black level calibration value BC2, instead of directly processing the first optical black analog information OB1 and the second optical black analog information OB2, the black level calibration circuit 15 receives and processes the first optical black digital information OBD1 and the second optical black digital information OBD2 fed back by the ADC 14. In other words, the black level calibration circuit 15 calculates the black level offset BC1 according to the first optical black digital information OBD1, and calculates the black level calibration value BC2 according to the black level offset BC1 and the second optical black digital information OBD2.

One of the unique features of the image sensors 1 is that the black level calibration circuit 15 generates the black level calibration value BC2 according to the first optical black analog information OB1 and the second optical black information OB2 of a same frame, thus capable of accurately calibrating the black level of the active analog information AP of the same frame in real-time.

Figure 2:
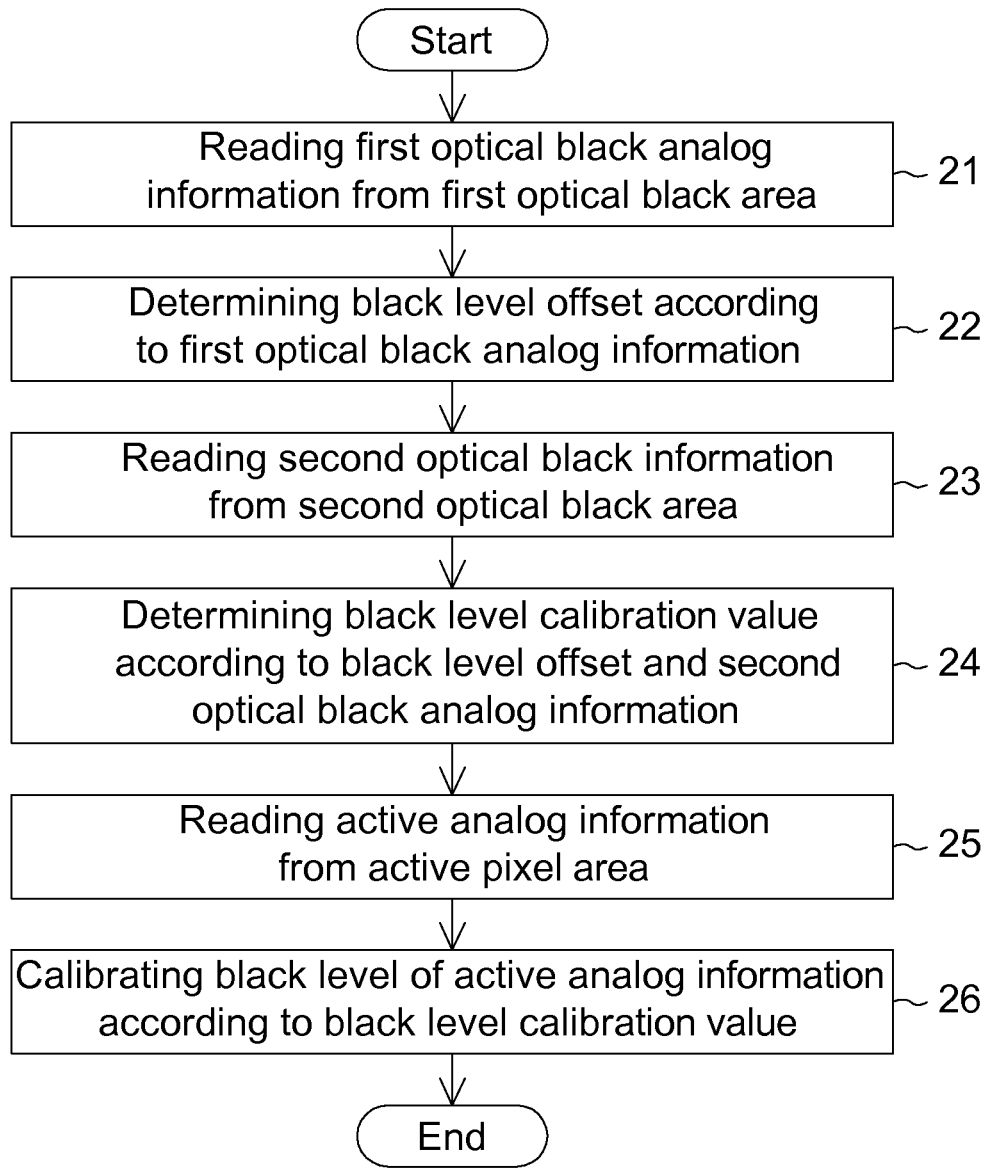
FIG. 2 is a flowchart of a black level calibration method for an image sensor according to an embodiment of the present invention.

FIG. 2 showing a flowchart of a black level calibration method for an image sensor according to an embodiment of the present invention shall be described below with reference to FIG. 1. The method is applicable to the image sensor shown in FIG. 1, and comprises Steps 21 to 26 to be described in detail below. In Step 21, the sampling circuit 12 reads the first optical black analog information OB1 from the first optical black area 111. In Step 22, the black level calibration circuit 15 determines the black level offset BC1 according to the first optical black information OB1. In Step 23, the sampling circuit 15 reads the second optical black analog information OB2 from the second optical black area 112. In Step 24, the black level calibration circuit 15 determines the black level calibration value BC2 according to the black level offset BC1 and the second optical black analog information OB2. As previously stated, in Steps 22 and 24, the black level calibration circuit 15 may respectively adopt the first and second optical black information OBD1 and OBD2 provided by the ADC 14 for the calculations. In Step 25, the sampling circuit 12 reads the active analog information AP from the active pixel area 113. In Step 26, the black level calibration circuit 15 calibrates the black level of the active analog information AP according to the black level calibration value BC2.

It should be noted that, Steps 21 to 26 may be performed after the analog gain AG is changed to avoid unnecessary operations. For example, the black level calibration circuit 15 may first determine whether the analog gain AG is changed, and the black level offset BC1 and the black level calibration value BC2 are not re-calculated in the event that the analog gain AG is not yet changed. Alternatively, Steps 21 to 26 may be designed to be performed after every n frames, where n is a positive integer.

Figure 3:
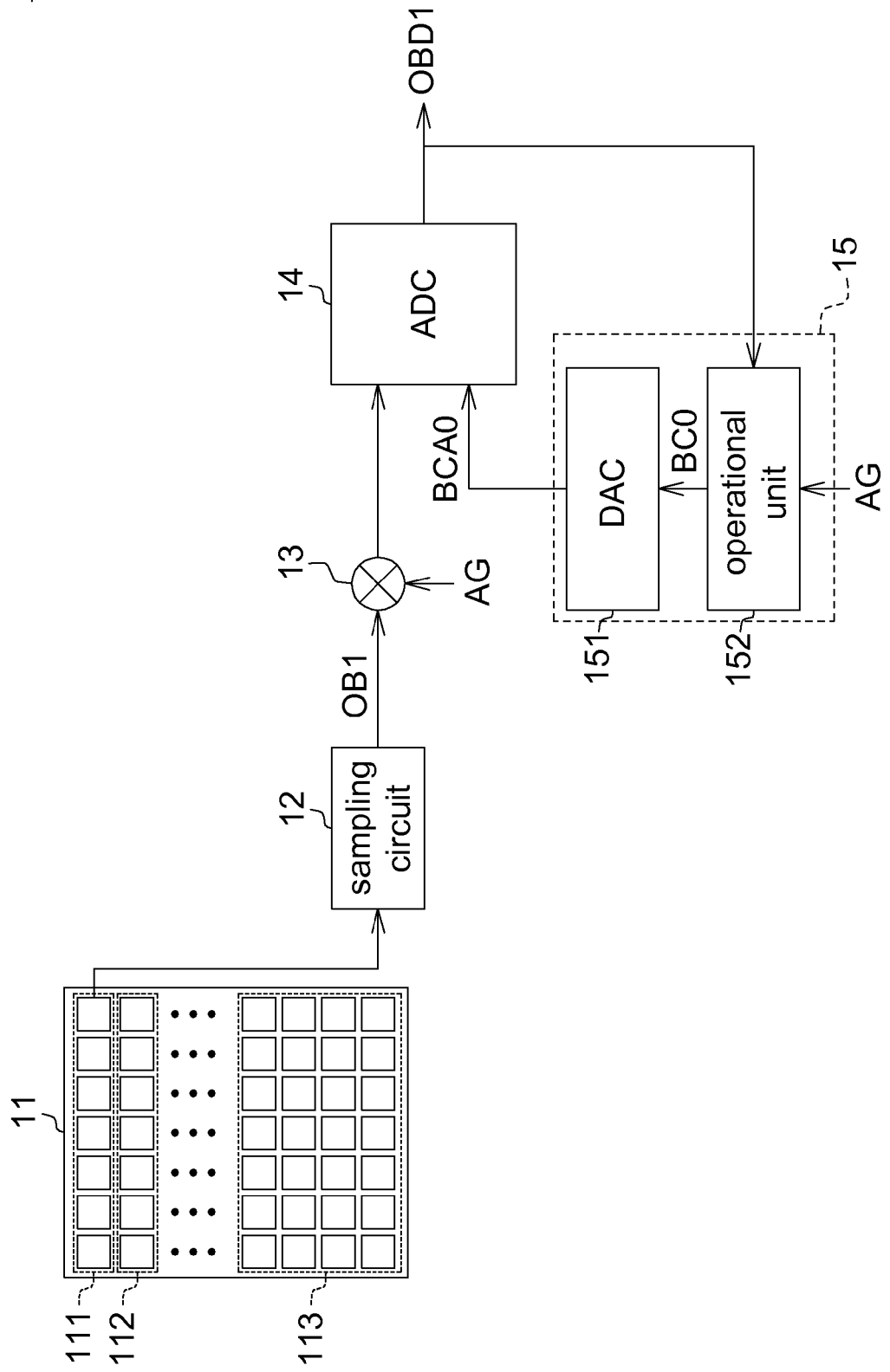
FIG. 3 is a schematic diagram of the image sensor in FIG. 1 outputting first optical black digital information.
Figure 4:
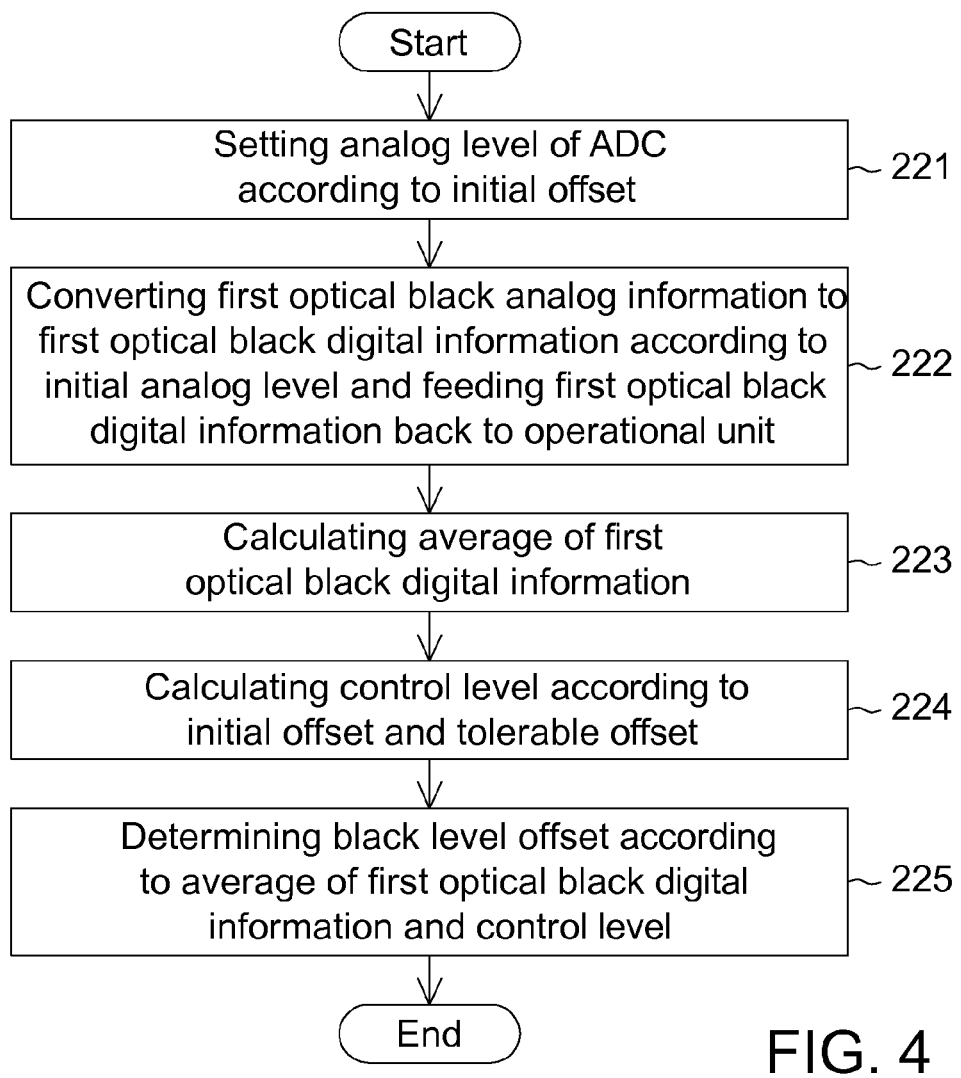
FIG. 4 is a detailed flowchart of Step 22 in FIG. 2 according to an embodiment of the present invention.
Figure 5:
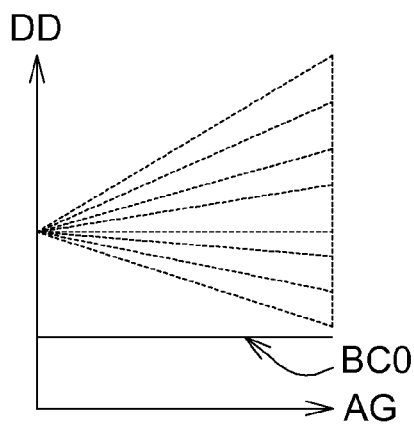
FIG. 5 is a schematic diagram of digital information outputted by an ADC and an analog gain according to an embodiment of the present invention.
Figure 6:
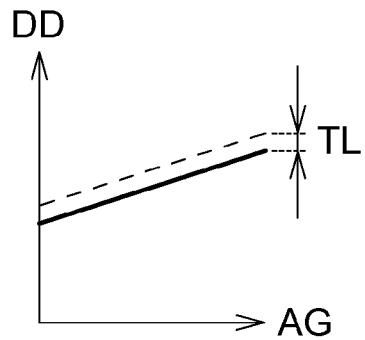
FIG. 6 is a schematic diagram of a tolerable offset according to an embodiment of the present invention.

Also refer to FIGS. 1, 3, 4, 5, 6 to better understand operational details of the steps in FIG. 2. FIG. 3 shows a schematic diagram of the image sensor in FIG. 1 outputting the first optical black digital information; FIG. 4 shows a detailed flowchart of Step 22 according to an embodiment of the present invention; FIG. 5 a schematic diagram of digital information outputted from the ADC and the analog gain according to an embodiment of the present invention; FIG. 6 shows a schematic diagram of a tolerable offset according to an embodiment of the present invention.

In this embodiment, Step 22 further comprises Steps 221 to 225. To realize this embodiment, the black level calibration circuit 15 may comprise a digital-to-analog converter (DAC) 151 and an operational unit 152. In Step 221, the DAC 151 sets the analog level AL of the ADC 14 to be equal to an initial analog level BCA0 according to an initial offset BC0. In Step 22, the ADC 14 converts the first optical black analog information OB1 to the first optical black digital information OBD1 according to the initial analog level BCA0 and feeds the first optical black digital information OBD1 to the operational unit 152. In Step 223, the operational unit 152 calculates an average of the first optical black digital information OBD1. Preferably, the operational unit 152 first eliminates dead pixels in the pixel array 11 and then calculates the average of the first optical black digital information OBD1.

In Step 224, the operational unit 152 calculates a control level according to the initial offset BC0 and a tolerable offset TL. For example, the control level substantially equals a difference between the initial offset BC0 and the tolerable offset TL. A relationship between the digital information DD outputted by the ADC 14 and the analog gain AG is as shown by a dotted line in FIG. 5. To ensure that the ADC 14 completely outputs the second optical black digital information OBD2, the operational unit 152 subtracts the tolerable offset TL from the initial offset BC0 to obtain the control level. In Step 225, the operational unit 152 determines the black level offset according to the average of the first optical black digital information OBD1 and the control level. For example, the black level offset can be a sum of the average of the first optical black digital information OBD1 and the control level. In an exemplary case, the initial offset BC0, the tolerable offset TL and the average of the first optical black digital information OBD1 are respectively 100, 10 and 50. The operational unit 152 first subtracts the tolerable offset TL from the initial offset BC0 to obtain a control level of 90. The operational unit 152 then adds the average of the first optical black digital information to the control level to obtain a black level offset of 140.

Figure 7:
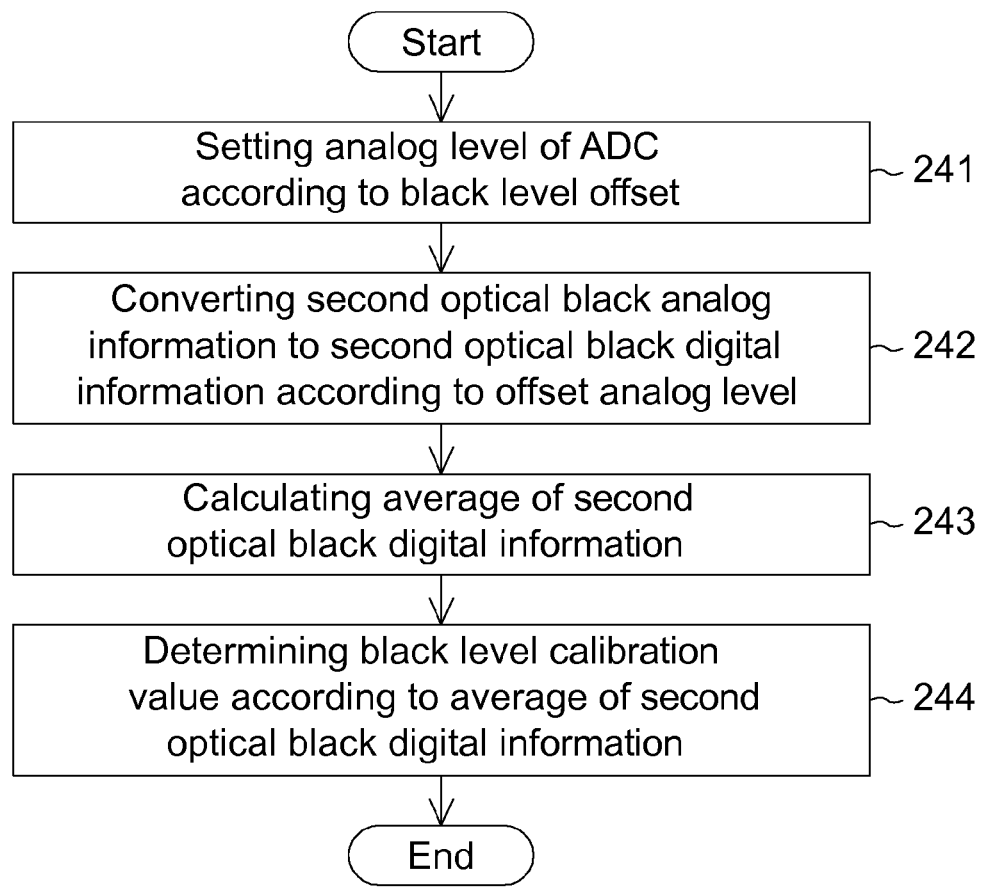
FIG. 7 is a detailed flowchart of Step 24 in FIG. 2.
Figure 8:
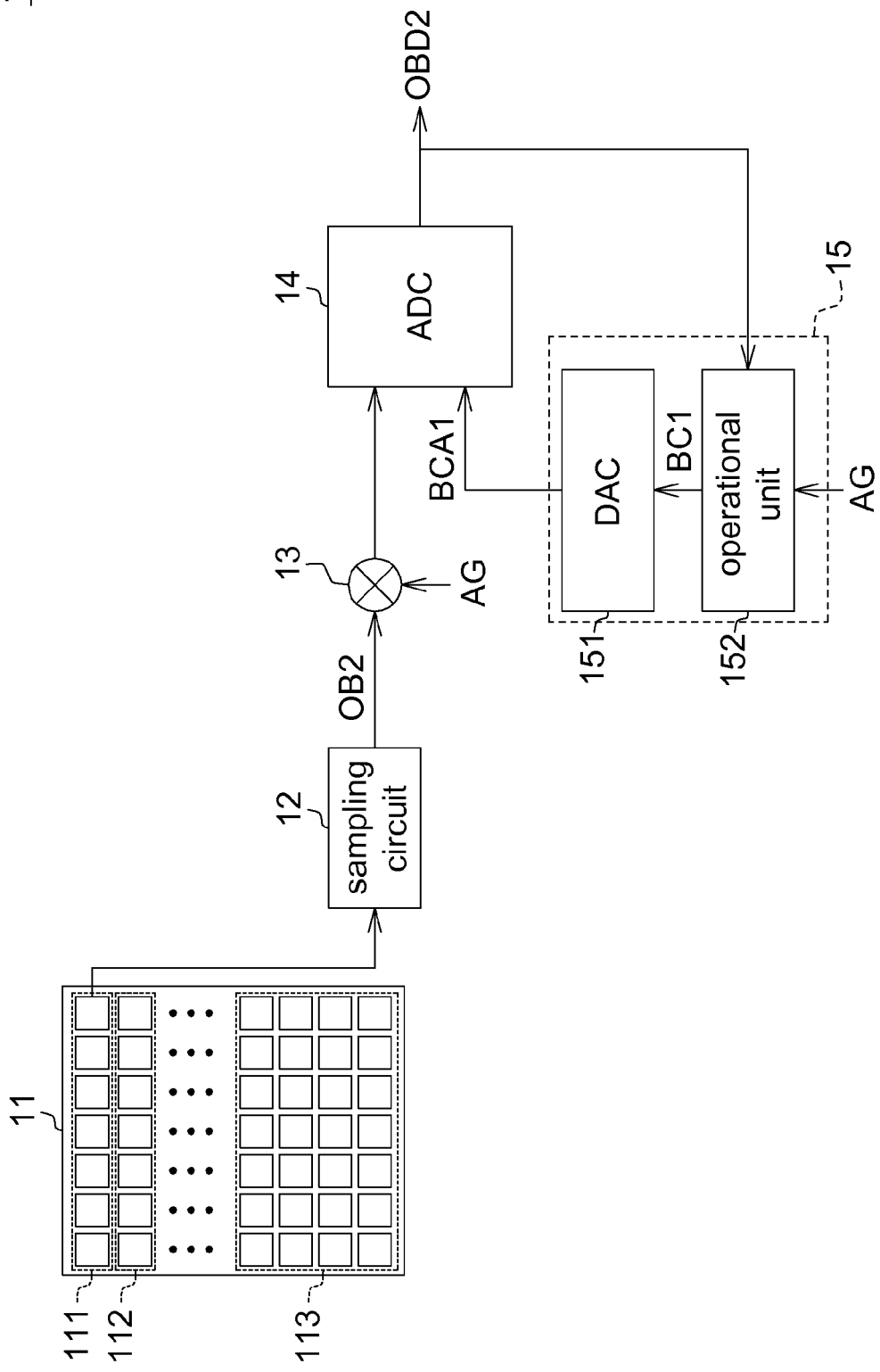
FIG. 8 is a schematic diagram of an image sensor outputting second optical black digital information.

Also refer to FIGS. 7 and 8 to better understand operational details of Step 24 in FIG. 2. FIG. 7 shows a detailed flowchart of Step 24 according to an embodiment of the present invention; FIG. 8 shows a schematic diagram of the image sensor 1 in FIG. 1 outputting the second optical black digital information according to an embodiment of the present invention. In this embodiment, Step 24 further comprises Steps 241 to 244. In Step 241, the DAC 151 sets the analog level AL of the ADC 14 to be equal to an offset analog level BCA1 according to the black level offset BC1 obtained from Step 22. In Step 242, the ADC 14 converts the second optical black analog information OB2 to the second optical black digital information OBD2 according to the offset analog level BCA1. Since the analog level of the ADC 14 is changed to the offset analog level BCA1 from the initial analog level BCA0, the ADC 14 is capable of shifting the second optical black analog information OB2 upwards or downwards to improve the black level caused by a black current. In Step 243, the operational unit 152 calculates an average of the second optical black digital information OBD2. Preferably, the operational unit 152 first eliminates dead pixels in the pixel array 11 and then calculates the average of the second optical black digital information OBD2. In Step 244, the operational unit 152 determines the black level calibration value according to the average of the second optical black digital information OBD2.

Figure 9:
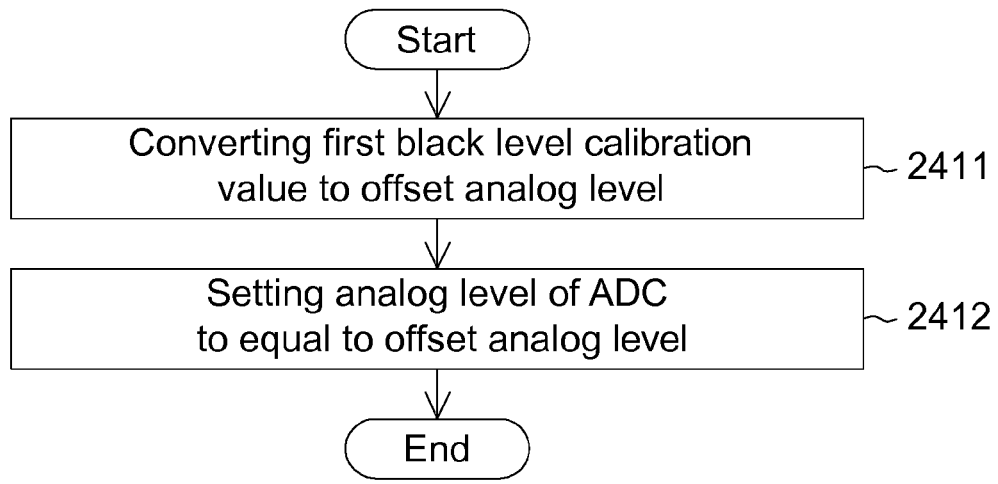
FIG. 9 is a detailed flowchart of Step 241 in FIG. 7 according to an embodiment of the present invention.

FIG. 9 showing a detailed flowchart of Step 241 in FIG. 7 according to an embodiment of the present invention shall be described with reference to FIG. 8. In this embodiment, Step 241 further comprises Steps 2411 to 2412. In Step 2411, the DAC 151 converts the black level offset BC1 to the offset analog level BCA1. In Step 2412, the analog level AL of the ADC 14 is set to equal the offset analog level BCA1. It should be noted that, when performing Step 2411, a clamping design may be further added to the DAC 151. For example, when the black level offset BC1 is smaller than or equal to a lower limit, the offset analog level BCA1 outputted by the DAC 151 equals the lower limit. When the black level offset BC1 is greater than or equal to an upper limit, the offset analog level outputted by the DAC 151 equals the upper limit. When the offset analog level BCA1 outputted by the black level offset 151 is greater than the lower limit and smaller than the upper limit, the DAC 151 directly converts the black level offset BC1 to the offset analog level BCA1.

Figure 10:
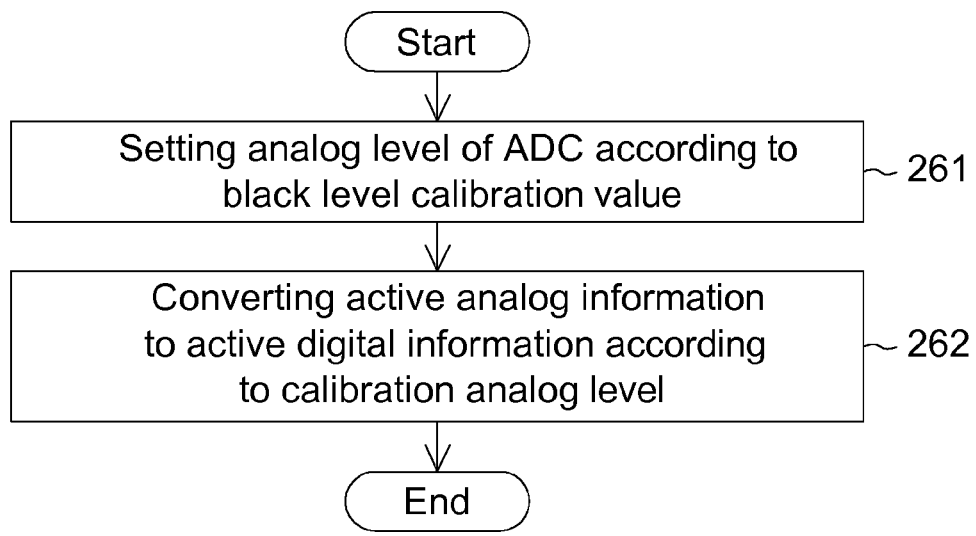
FIG. 10 is a first detailed flowchart of Step 26 in FIG. 2 according to an embodiment of the present invention.
Figure 11:
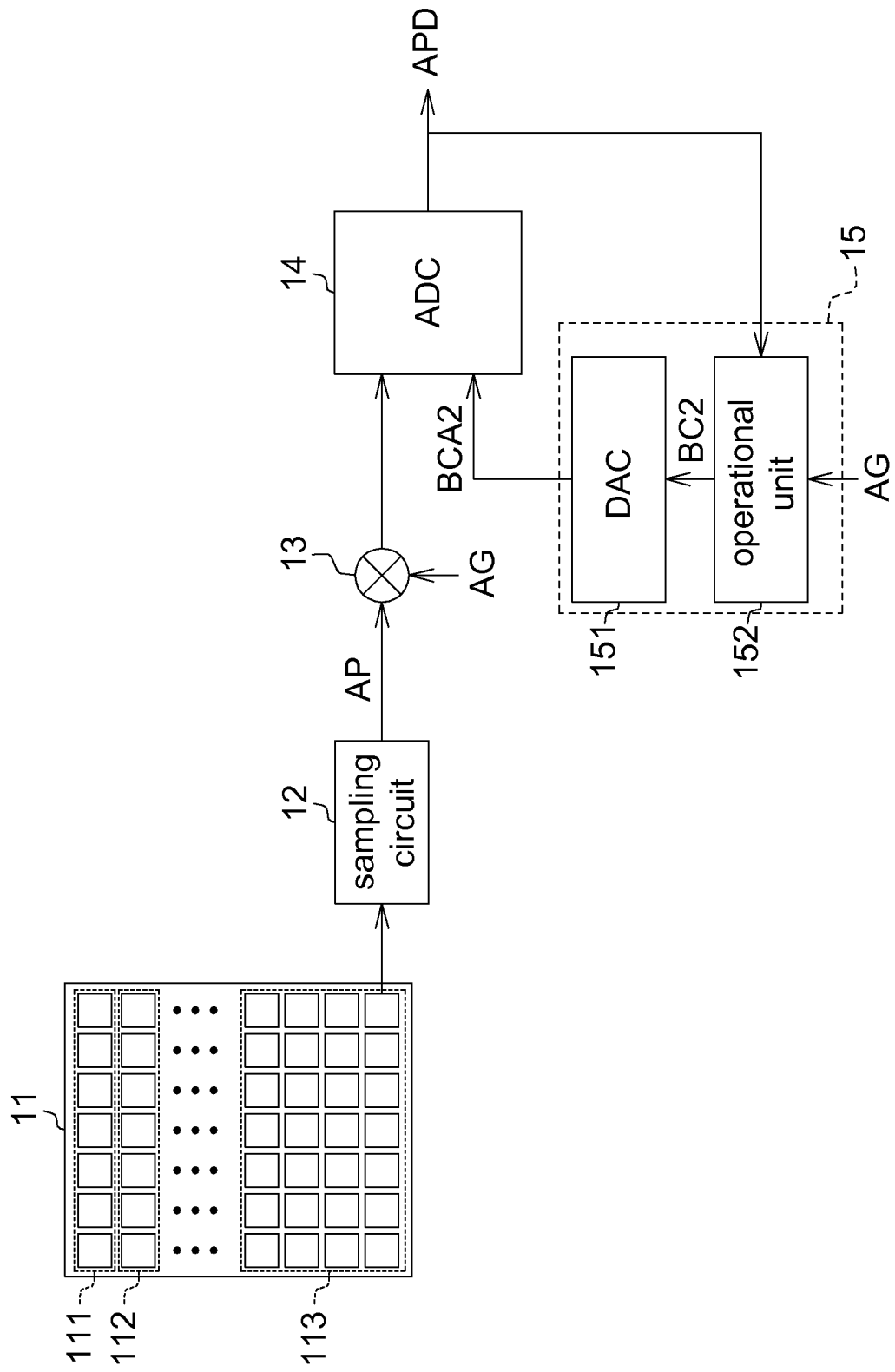
FIG. 11 is a schematic diagram of the image sensor 1 in FIG. 1 outputting active digital information when applied in this embodiment of the present invention.

Also refer to FIGS. 10 and 11 to better understand operational details of Step 26 in FIG. 2. FIG. 10 shows a detailed flowchart of Step 26 according to an embodiment of the present invention; FIG. 11 shows a schematic diagram of the image sensor 1 outputting active digital information according to this embodiment of the present invention. In Step 261, the DAC 151 sets the analog level of the ADC 14 to equal to a calibration analog level BCA2 according to the black level calibration value BC2. In Step 262, the ADC 14 converts the active analog information AP to active digital information APD according to the calibration analog level BCA2.

Since the analog level of the ADC 14 is changed to the calibration analog level BCA2 from the initial analog level BCA1, the ADC 14 is capable of shifting the active analog information AP upwards or downwards to improve the black level caused by a black current.

Figure 12:
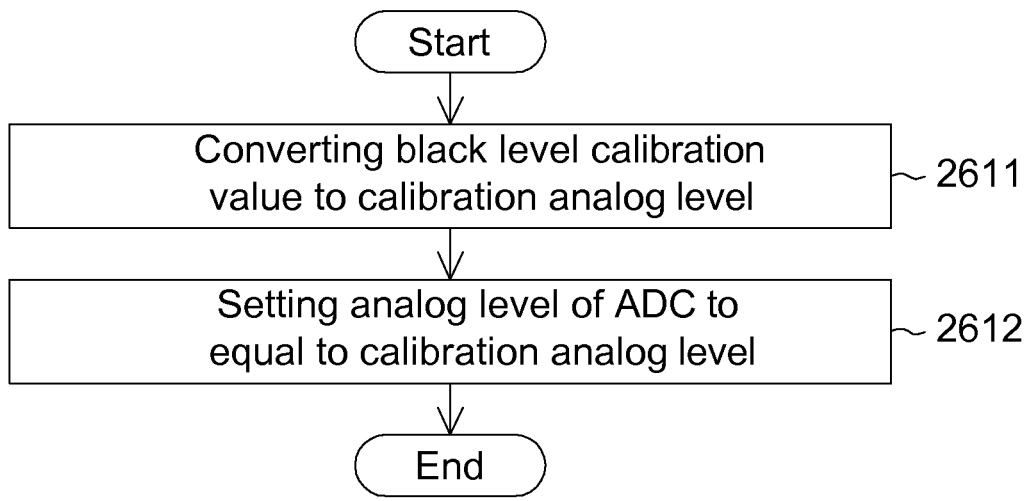
FIG. 12 is a detailed flowchart of Step 261 in FIG. 10.

FIG. 12 showing a detailed flowchart of Step 261 according to an embodiment of the present invention shall be described with reference to FIG. 11. Step 261 further comprises Steps 2611 to 2612. In Step 2611, the DAC 151 converts the black level calibration value BC2 to a calibration analog level BCA2. In Step 2612, the DAC 151 sets the analog level AL of the ADC 14 to be equal to the calibration analog level BCA2. It should be noted that, when performing Step 2611, a clamping designed may be added to the DAC 151. For example, when the black level calibration value BC2 is smaller than or equal to a lower limit, the calibration analog level BCA2 outputted by the DAC 151 equals the lower limit. When the black level calibration value BC2 is greater than or equal to an upper limit, the calibration analog level BCA2 outputted by the DAC 151 equals the upper limit. When the offset analog level outputted by the black level offset 151 is greater than the lower limit and smaller than the upper limit, the DAC 151 directly converts the black level calibration value BC2 to the calibration analog level BCA2.

Figure 13:
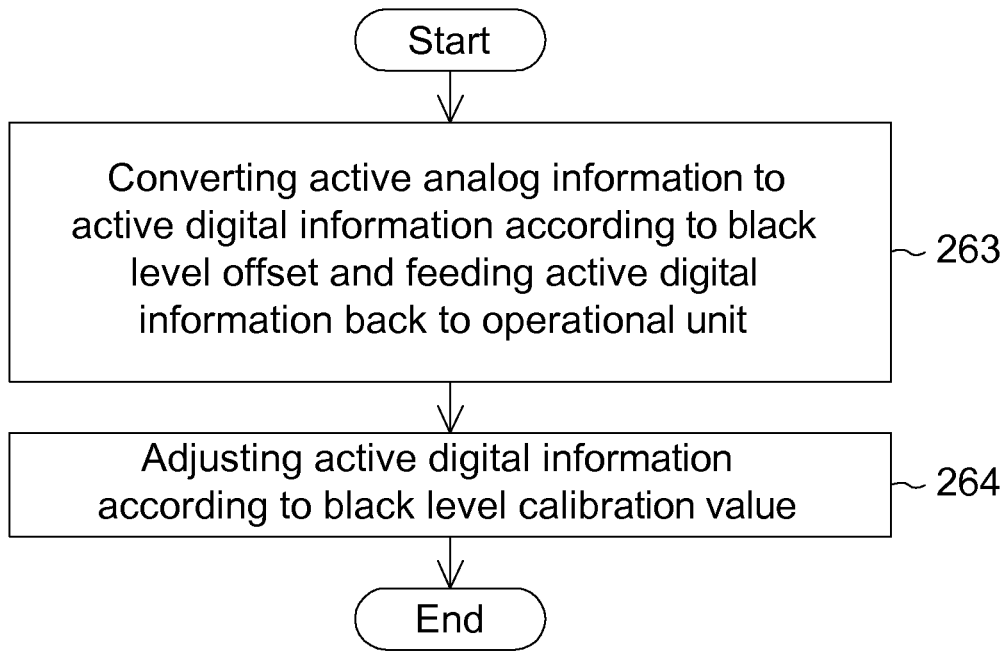
FIG. 13 is a second detailed flowchart of Step 26 in FIG. 2 according to another embodiment of the present invention.

FIG. 13 showing a detailed flowchart of Step 26 in FIG. 2 according to another embodiment of the present invention shall be described with reference to FIG. 11. Step 26 further comprises Steps 263 to 264. In Step 263, the ADC 14 converts the active analog information AP to the active digital information APD according to the black level offset obtained from Step 22, and feeds the active digital information APD back to the operational unit 152. In Step 264, the operational unit 152 adjusts the active digital information APD according to the black level calibration value obtained from Step 24. A main difference between this embodiment and the embodiment shown in FIG. 10 is that, the active digital information APD in the embodiment in FIG. 10 is outputted after adjustment performed by the ADC 14, whereas the active digital information APD in the embodiment in FIG. 13 is outputted after adjustment performed by the operational unit 152.

In the above embodiment, the black level calibration circuit 15 performs a two-stage calibration procedure. In the first stage, the black level calibration circuit 15 first obtains the black level offset BC1 according to the first optical black analog information OB1 associated with the first optical black area 111, and adjusts the level of the ADC 14 according to the black level offset BC1 to calibrate the black level of the second optical black analog information OB2. Therefore, the second optical black digital information OBD2 outputted by the ADC 14 is black digital information obtained after the first-stage calibration.

The black level calibration circuit 15 then performs the second-stage calibration procedure. The black level calibration circuit 15 obtains a black level calibration value according to the second optical black analog information OB2 associated with the black area 112. The second optical black digital information OBD2 having been processed by the first-stage calibration may be utilized to calculate the black level calibration value BC2. Thus, the black level calibration circuit 15 is allowed to adjust the level of the ADC 14 according to the black level calibration value BC2 to calibrate the black level of the active analog information AP. Accordingly, the active digital information ADP outputted by the ADC 14 is active digital information obtained after the second-stage calibration.

The black level calibration circuit generates the black level calibration value BC2 according to the first optical black analog information OB1 and the second optical black analog information OB2 both of a same frame, and therefore the black level of the active analog information AP of a same frame may be in real-time accurately calibrated.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A black level calibration method for an image sensor, the image sensor at least comprising a pixel array, the pixel array comprising a first optical black area, a second optical black area and an active pixel area, the method comprising:
   a) reading first optical black analog information from the first optical black area;
   b) determining a black level offset according to the first optical black analog information;
   c) reading second optical black analog information from the second optical black area;
   d) determining a black level calibration value according to the black level offset and the second optical black analog information;
   e) reading active analog information from the active pixel area; and
   f) calibrating a black level of the active analog information according to the black level calibration value.

2. The method according to claim 1, wherein the image sensor further comprises an analog-to-digital converter (ADC), and the step (b) comprises:
   b1) setting an analog level of the ADC according to an initial offset;
   b2) converting the first optical black analog information to first optical black digital information according to the initial offset;
   b3) calculating an average of the first optical black digital information;
   b4) calculating a control level according to the initial offset and a tolerable offset; and
   b5) determining the black level offset according to the average of the first active digital information and the control level.

3. The method according to claim 2, wherein the black level offset equals a sum of the average of the first active digital information and the control level.

4. The method according to claim 2, wherein the control level equals a difference between the initial offset and the tolerable offset.

5. The method according to claim 1, wherein the image sensor further comprises an ADC, and the step (d) comprises:
   d1) setting an analog level of the ADC according to the black level offset;
   d2) converting the second optical black analog information to second optical black digital information according to the black level offset;
   d3) calculating an average of the second active digital information; and
   d4) determining the black level calibration value according to the average of the second optical black digital information.

6. The method according to claim 5, wherein the step (d1) comprises:
   d1-1) converting the black level offset to an offset analog level; and
   d1-2) setting the analog level of the ADC to equal to the offset analog level.

7. The method according to claim 6, wherein when the black level offset is smaller than or equal to a lower limit, the offset analog level equals to the lower limit; when the black level offset is greater than or equal to an upper limit, the offset analog level equals the upper limit.

8. The method according to claim 1, wherein the image sensor further comprises an ADC, and the step (f) comprises:
   f1) setting an analog level of the ADC according to the black level calibration value; and
   f2) converting the active analog information to active digital information according to the black level calibration value.

9. The method according to claim 8, wherein the step (f1) comprises:
   f1-1) converting the black level calibration value to a calibration analog level; and
   f1-2) setting the analog level of the ADC to equal to the calibration analog level.

10. The method according to claim 8, wherein when the black level offset is smaller than or equal to a lower limit, the calibration analog level equals to the lower limit; when the black level offset is greater than or equal to an upper limit, the calibration analog level equals the upper limit.

11. The method according to claim 1, wherein the image sensor further comprises an ADC, and the step (f) comprises:
   f1) converting the active analog information to active digital information according to the black level offset; and
   f2) adjusting the active digital information according to the black level calibration value.

12. The method according to claim 1, wherein the steps (a) to (f) are performed after an analog gain is changed.

13. The method according to claim 1, wherein the steps (a) to (f) are performed after every n frames, where n is a positive integer.

14. An image sensor, comprising:
   a pixel array, comprising:
      a first optical black area;
      a second optical black area;
      an active pixel area;
   a sampling circuit, for reading first optical black analog information from the first optical black area, second optical black analog information from the second optical black area, and active analog information from the active pixel area; and
   a black level calibration circuit, for determining a black level offset according to the first optical black analog information, and determining a black level calibration value for calibrating a black level of the active analog information according to the black level offset and the second optical black analog information.

15. The image sensor according to claim 14, further comprising an ADC, wherein the black level calibration circuit further comprises:
   a digital-to-analog converter (DAC), for setting an analog level of the ADC according to an initial offset, so that the ADC converts the first optical black analog information to first optical black digital information according to the initial offset; and
   an operational unit, for calculating an average of the first optical black digital information, calculating a control level according to the initial offset and a tolerable offset, and determining the black level offset according to the average of the first optical black digital information and the control level.

16. The image sensor according to claim 15, wherein the black level offset equals a sum of the average of the first optical black digital information and the control level.

17. The image sensor according to claim 15, wherein the control level equals a difference between the initial offset and the tolerable offset.

18. The image sensor according to claim 14, further comprising an ADC, wherein the black level calibration circuit sets an analog level of the ADC according to the black level offset, the ADC converts the second optical black analog information to second optical black digital information according to the black level offset, and the black level calibration circuit calculates an average of the second optical black digital information and determines the black level calibration value according to the average of the second optical black digital information.

19. The image sensor according to claim 18, further comprising an ADC, wherein the black level calibration circuit comprises:
   a DAC, for converting the black level offset to an offset analog level, and setting the analog level of the ADC to equal to the offset analog level.

20. The image sensor according to claim 14, further comprising an ADC, wherein the black level calibration circuit sets an analog level of the ADC according to the black level calibration value, and converts the active analog information to active digital information according to the black level calibration value.

21. The image sensor according to claim 20, further comprising an ADC, wherein the black level calibration circuit comprises:
   a DAC, for converting the black level calibration value to a calibration analog level, and setting the analog level of the ADC to equal to the calibration analog level.

22. The image sensor according to claim 14, further comprising:
   an ADC, for converting the active analog information to active digital information according to the black level offset, and adjusting the active digital information according to the black level calibration value.

* * * * *